No. 691,989. Patented Jan. 28, 1902.
E. & F. E. WALKER.
REGISTERING DIRECTORY OR INDICATOR FOR OFFICES.
(Application filed Mar. 29, 1901.)
(No Model.)
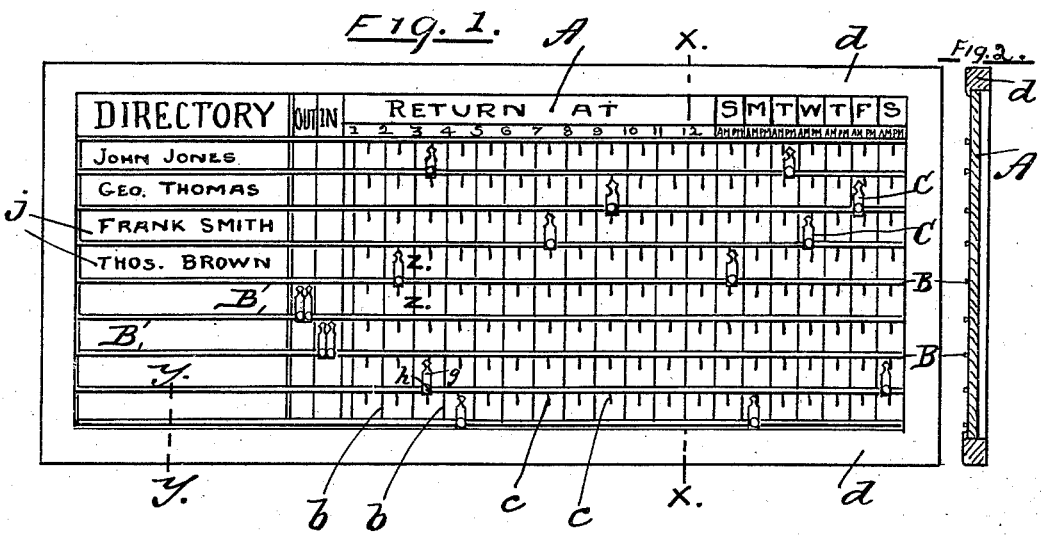
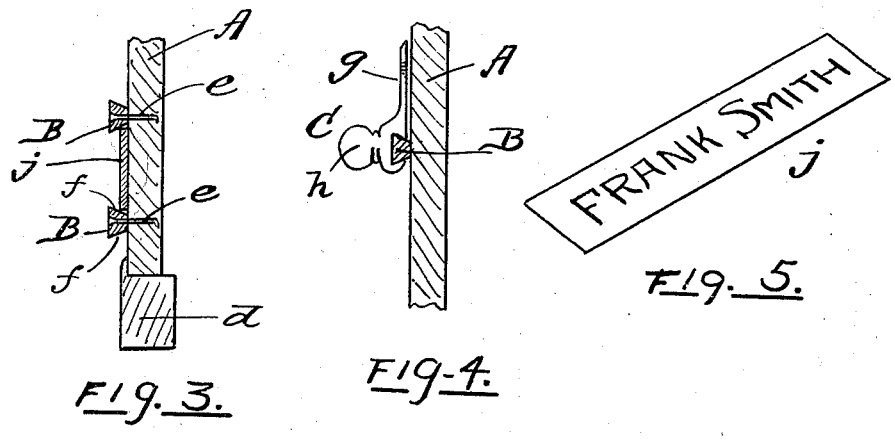
WITNESSES:
Grace L. Sweet
Dan. E. Locke
INVENTORS:
Elmer Walker
Frank Ernest Walker

UNITED STATES PATENT OFFICE.

ELMER WALKER, OF RIVER POINT, RHODE ISLAND, AND FRANK ERNEST WALKER, OF BOSTON, MASSACHUSETTS.

REGISTERING DIRECTORY OR INDICATOR FOR OFFICES.

SPECIFICATION forming part of Letters Patent No. 691,989, dated January 28, 1902.

Application filed March 29, 1901. Serial No. 53,536. (No model.)

*To all whom it may concern:*

Be it known that we, ELMER WALKER, residing at River Point, in the county of Kent and State of Rhode Island, and FRANK ERNEST WALKER, residing at Boston, in the county of Suffolk and State of Massachusetts, citizens of the United States, have invented a certain appliance for the purpose of indicating whether in or out, or time of return of parties that may register their names thereon, or for other purposes to which this principle may be applied, of which the following is a specification.

This invention relates to an indicator adapted for use in hotels or office buildings to indicate when the occupant is out and at what hour the person will return; and the object of our invention is to produce an indicator which shall be simple in its construction and with little cost to manufacture.

Our invention consists in the combination, with a chart having a series of numerals and letters printed thereon to signify the hour of the day and day of the week, respectively, said numerals and letters arranged in a horizontal line at the top portion of said chart with vertical lines therefrom, of a series of rods rigidly secured and horizontally disposed upon the said chart and provided with inclined faces to receive cards and index-pointers, respectively, as hereinafter fully described and claimed.

In the accompanying sheet of drawings, forming a part of this specification, Figure 1 represents a front elevation of the indicator. Fig. 2 is a vertical sectional view taken in line $x\,x$ of Fig. 1. Fig. 3 is an enlarged partial vertical sectional view of the indicator, taken in line $y\,y$ of Fig. 1. Fig. 4 is a similar sectional view taken in line $z\,z$ of Fig. 1. Fig. 5 is a perspective view of an occupant's card.

Similar letters of reference indicate similar parts in the different views of the drawings.

A indicates the chart, which is made of wood, papier-mâché, or other suitable material, of a rectangular form and having the following words, numerals, and letters arranged in a horizontal line at the top portion thereof: Beginning at the left hand the word "Directory," denoting a heading for a column exposing a list of names, then the words "Out" and "In," following which a series of numerals running from "1" to "12," denoting the hour, with the words "Return at" over the said numerals, and, finally, the capital letters "S," "M," "T," &c., for each day of the week, with the respective abbreviations "A. M." "P. M." printed beneath each of said letters. From the word "Directory" the chart is spaced by vertical lines $b\,b$, equidistant and dividing the words "Out" and "In" from each of the numerals denoting the hour, and between each of the letters referring to the day of the week, respectively, these lines form columns which extend the full depth of the chart, and which columns are subdivided by short vertical lines $c\,c$, forming a series of horizontal lines on the chart. This chart is mounted and secured upon a suitable frame $d$.

B B indicate metallic rods which extend in a horizontal plane with the upper ends of each of the series of lines $c\,c$ of the chart to the full width of the same and are provided with perforations at divers points in their length and through which pins $e\,e$ are driven to secure the rods to the chart.

Each of the rods B B is provided with inwardly-inclined faces $f\,f$, (see Fig. 3,) which extend the full length of the rod.

C C are index-pointers, two of which are mounted upon each of the rods B B and are held in position by the inclined faces thereon. Each of these pointers is made of resilient material, so as to slide with frictional contact upon the faces of the rods, with an upwardly-extending arrow-shaped arm $g$ integral therewith and provided with an outwardly-projecting knob $h$ for the purpose of moving the pointer to that point of the chart as required.

The left portion of the rods B B, which extend in the directory-column, serve as panels for the sliding through of an occupant's card $j$, having the name marked thereon, in the manner as illustrated in Fig. 5.

This construction of an indicator is specially adapted for use in office buildings, hotels, or dwellings to facilitate the time of return of those professional or other persons who leave their quarters for the time being.

This requirement has been met by our invention, which is designed to be used as follows:

Assuming that "John Jones" is going to leave his apartment or office to be away, say, until half-past three o'clock the following Tuesday afternoon, he would first insert his name-card between the rods of the directory-column, after which he would move the right-hand pointer to the last half of the divided column which registers "p. m.," beneath the capital letter "T," with the opposite pointer moved to the center line $c$ of the divided column relative of the hour or numeral "3," thus indicating that John Jones will return at half-past three o'clock Tuesday afternoon. If "George Thomas" is to be gone until half-past nine Friday morning, the right-hand pointer would be set to the first half of the column marked "a. m." "F" and the opposite pointer set to the center of the column of the hour number "9" in the manner as shown in Fig. 1.

This construction of an indicator contains in itself all that is necessary for allowing of quick adjustment to indicate the return of an occupant, and at the same time it is simple, durable, and with little cost to manufacture.

Having described our invention, what we claim is—

In an indicator of the class described, the combination of a chart having imprinted upon its face the words, numerals, and letters, arranged in a horizontal line at the top portion thereof, with lines extending vertically therefrom, as shown and described; a series of rods secured and arranged horizontally upon said chart, each of said rods provided with inwardly-inclined faces; a name-card adapted to be inserted between said rods and held in position by the inclined faces thereof; with indicating-arms supported by said rods and adapted to be moved to any vertical line on said chart, substantially as shown and for the purpose specified.

ELMER WALKER.
FRANK ERNEST WALKER.

Witnesses:
J. R. MURPHY,
LUCIAN W. SEARLE.